(12) United States Patent
Ludwig et al.

(10) Patent No.: US 9,213,611 B2
(45) Date of Patent: Dec. 15, 2015

(54) AUTOMATIC RAID MIRRORING WHEN ADDING A SECOND BOOT DRIVE

(71) Applicant: Western Digital Technologies, Inc., Irvine, CA (US)

(72) Inventors: Thomas E. Ludwig, Perris, CA (US); John E. Maroney, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 162 days.

(21) Appl. No.: 14/010,458

(22) Filed: Aug. 26, 2013

(65) Prior Publication Data

US 2015/0033067 A1    Jan. 29, 2015

Related U.S. Application Data

(60) Provisional application No. 61/858,095, filed on Jul. 24, 2013.

(51) Int. Cl.
| | | |
|---|---|---|
| *G06F 11/00* | (2006.01) | |
| *G06F 11/20* | (2006.01) | |
| *G06F 11/07* | (2006.01) | |

(52) U.S. Cl.
CPC ........ *G06F 11/2069* (2013.01); *G06F 11/0727* (2013.01); *G06F 11/201* (2013.01); *G06F 11/2056* (2013.01)

(58) Field of Classification Search
CPC ............ G06F 11/2069; G06F 11/0727; G06F 11/1092; G06F 11/1612; G06F 11/201; G06F 11/2053; G06F 11/2056
USPC .......................... 714/6.22, 6.23, 6.21, 6.1, 6.2
See application file for complete search history.

(56) References Cited

U.S. PATENT DOCUMENTS

| | | |
|---|---|---|
| 6,499,054 B1 | 12/2002 | Hesselink et al. |
| 6,704,838 B2 | 3/2004 | Anderson |
| 6,732,158 B1 | 5/2004 | Hesselink et al. |
| 6,795,895 B2 | 9/2004 | Merkey et al. |
| 6,862,609 B2 | 3/2005 | Merkey |
| 6,931,519 B1 | 8/2005 | Keller |
| 7,035,972 B2 | 4/2006 | Guha et al. |
| 7,120,692 B2 | 10/2006 | Hesselink et al. |
| 7,137,034 B2 | 11/2006 | Largman et al. |
| 7,143,249 B2 | 11/2006 | Strange et al. |
| 7,395,402 B2 | 7/2008 | Wilson et al. |
| 7,401,197 B2 | 7/2008 | Kezuka et al. |
| 7,424,637 B1 | 9/2008 | Schoenthal et al. |

(Continued)

FOREIGN PATENT DOCUMENTS

| | | |
|---|---|---|
| KR | 1020120027880 | 3/2012 |
| WO | 2012046929 | 4/2012 |

OTHER PUBLICATIONS

International Search Report and Written Opinion dated Nov. 6, 2014 from related PCT Serial No. PCT/US2014/047915, 9 pages.

*Primary Examiner* — Joseph D Manoskey

(57) ABSTRACT

A storage system including a first boot drive configured to store an operating system, one or more data drives configured to store user data, the one or more data drives distinct from the first boot drive, and a controller configured to detect when a second boot drive is added to the storage system, and automatically configure the first boot drive and the second boot drive in a redundant array of independent disks ("RAID") configuration when the controller detects that the second boot drive is added to the storage system.

24 Claims, 3 Drawing Sheets

(56) References Cited

U.S. PATENT DOCUMENTS

| | | | |
|---|---|---|---|
| 7,454,443 B2 | 11/2008 | Ram et al. | |
| 7,467,187 B2 | 12/2008 | Hesselink et al. | |
| 7,484,039 B2 | 1/2009 | Qiu et al. | |
| 7,536,598 B2 | 5/2009 | Largman et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,634,615 B2 | 12/2009 | Sutardja | |
| 7,640,292 B1* | 12/2009 | Smoot | 709/202 |
| 7,676,694 B2 | 3/2010 | Sullivan et al. | |
| 7,681,007 B2 | 3/2010 | Rustagi et al. | |
| 7,702,897 B2 | 4/2010 | Reed et al. | |
| 7,788,404 B2 | 8/2010 | Hesselink et al. | |
| 7,814,273 B2 | 10/2010 | Barrall | |
| 7,831,793 B2 | 11/2010 | Chakravarty et al. | |
| 7,861,036 B2 | 12/2010 | Byrne et al. | |
| 7,917,628 B2 | 3/2011 | Hesselink et al. | |
| 7,934,251 B2 | 4/2011 | Hesselink et al. | |
| 7,941,501 B2 | 5/2011 | McCabe et al. | |
| 7,949,564 B1 | 5/2011 | Hughes et al. | |
| 8,001,417 B2 | 8/2011 | Byrne et al. | |
| 8,004,791 B2 | 8/2011 | Szeremeta et al. | |
| 8,074,092 B2 | 12/2011 | Fung | |
| 8,194,547 B1 | 6/2012 | Sardella et al. | |
| 8,255,661 B2 | 8/2012 | Karr et al. | |
| 8,266,376 B2 | 9/2012 | Maroney et al. | |
| 8,285,965 B2 | 10/2012 | Karr et al. | |
| 8,296,398 B2 | 10/2012 | Lacapra et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,352,750 B2 | 1/2013 | Haines et al. | |
| 8,438,423 B1 | 5/2013 | Barkelew | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 2002/0053047 A1* | 5/2002 | Gold | 714/45 |
| 2002/0101711 A1 | 8/2002 | Gold | |
| 2002/0112198 A1* | 8/2002 | Lim et al. | 714/7 |
| 2003/0037187 A1* | 2/2003 | Hinton et al. | 710/1 |
| 2003/0149750 A1 | 8/2003 | Franzenburg | |
| 2004/0019824 A1* | 1/2004 | McCombs | 714/13 |
| 2004/0073747 A1 | 4/2004 | Lu | |
| 2004/0215952 A1* | 10/2004 | Oguma | 713/1 |
| 2005/0144195 A1 | 6/2005 | Hesselink et al. | |
| 2005/0144200 A1 | 6/2005 | Hesselink et al. | |
| 2007/0050538 A1 | 3/2007 | Northcutt et al. | |
| 2007/0233821 A1 | 10/2007 | Sullivan et al. | |
| 2007/0234118 A1 | 10/2007 | Sardella et al. | |
| 2008/0040462 A1* | 2/2008 | Islam et al. | 709/222 |
| 2009/0228651 A1 | 9/2009 | Sharma et al. | |
| 2009/0259816 A1 | 10/2009 | Sharma et al. | |
| 2011/0113194 A1 | 5/2011 | Terry et al. | |
| 2012/0036041 A1 | 2/2012 | Hesselink | |
| 2012/0284493 A1 | 11/2012 | Lou et al. | |
| 2013/0061029 A1 | 3/2013 | Huff et al. | |
| 2013/0067191 A1 | 3/2013 | Mehra et al. | |
| 2013/0117502 A1 | 5/2013 | Son et al. | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |

* cited by examiner

AUTOMATIC RAID MIRRORING WHEN ADDING A SECOND BOOT DRIVE

CROSS-REFERENCE TO RELATED APPLICATIONS

This application claims the benefit of U.S. Provisional Application No. 61/858,095, filed on Jul. 24, 2013, entitled "AUTOMATIC RAID MIRRORING WHEN ADDING A SECOND BOOT DRIVE," which is hereby incorporated by reference in its entirety.

BACKGROUND

A conventional storage system may comprise a boot drive and a data drive. However, the boot drive and the data drive may be prone to failure. If the boot drive fails, the conventional storage system may be unable to boot up. If the data drive fails, user data may be lost. Conventional redundancy systems have been employed for the conventional storage system in order to reduce the risk of failure to the boot drive and the data drive. However, in such a case, the user may have to manually configure all of the boot drives or all of the data drives in order to set them up in a redundancy system. Furthermore, if one of the data drives fail or one of the boot drives fail, replacing the failed data drive or the failed boot drive may require that the user manually reconfigure all of the boot drives or all of the data drives in order to set them up in a redundancy system.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
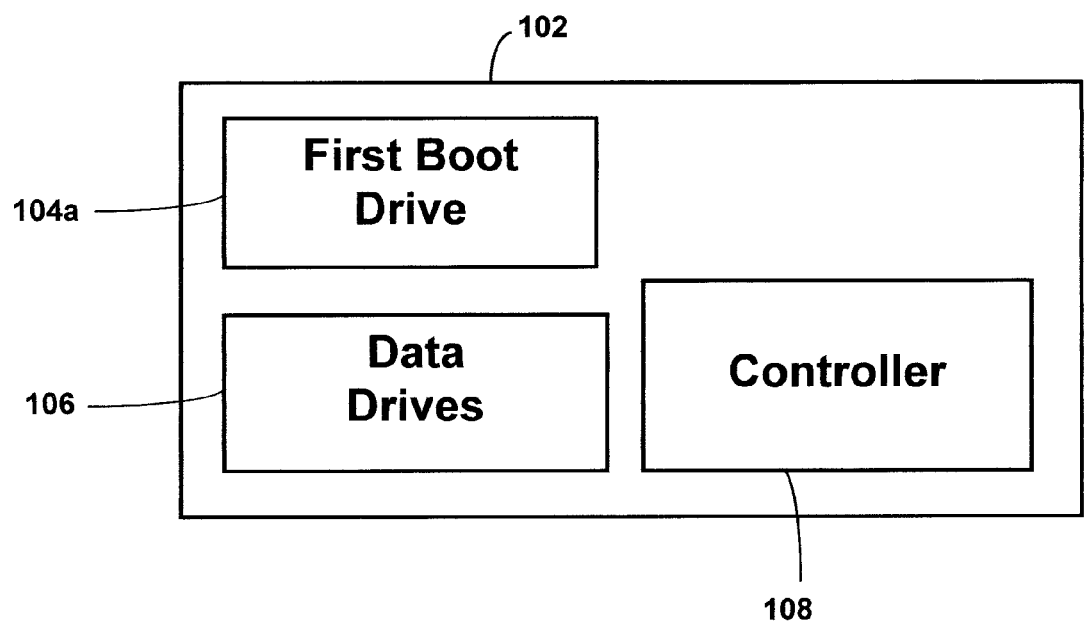
FIG. 1 depicts a storage system according to an embodiment.

In an embodiment, a storage system 102 comprises a server as shown in FIG. 1. In an embodiment, the server comprises a pedestal format. In an embodiment, the storage system 102 comprises a network attached storage ("NAS") device. As shown in the embodiment in FIG. 1, the storage system 102 comprises one or more boot drives 104 such as a first boot drive 104a. In an embodiment, the one or more boot drives 104 are configured to store an operating system. The storage system 102 also comprises data drives 106 and a controller 108.

Figure 2:
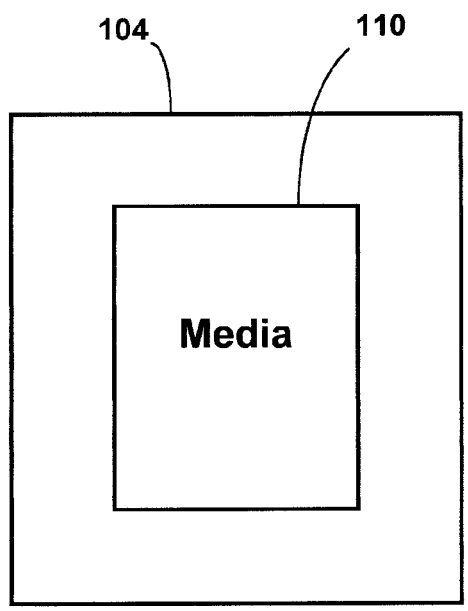
FIG. 2 depicts a boot drive according to an embodiment.

In an embodiment, each of the boot drives 104 comprises at least one of a hard disk drive or a solid state drive. In an embodiment, each of the boot drives 104 comprises a media 110 as shown in FIG. 2. In an embodiment the media 110 comprises at least one of a magnetic rotating disk or a solid state memory.

Figure 3:
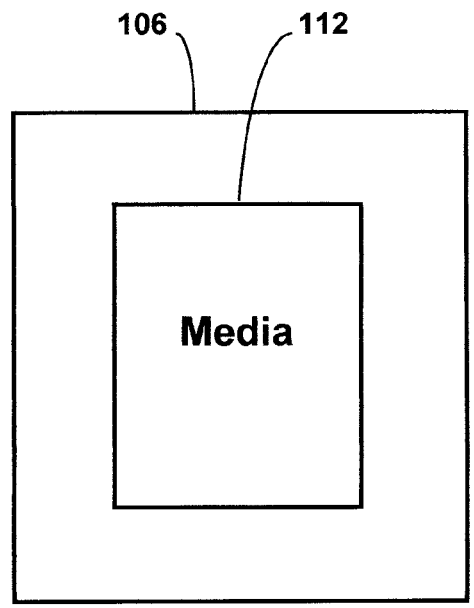
FIG. 3 depicts a data drive according to an embodiment.

In an embodiment, each of the data drives 106 comprises at least one of a hard disk drive or a solid state drive. In an embodiment, each of the data drives 106 comprises a media 112 as shown in FIG. 3. In an embodiment, the media 112 comprises at least one of a magnetic rotating disk or a solid state memory. In an embodiment, the data drives 106 are configured to store user data and are distinct from the boot drives 104.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Referring back to FIG. 1, in an embodiment, the controller 108 comprises a central processing unit ("CPU"), an application specific integrated circuit ("ASIC"), a processor, or any combination thereof. In an embodiment, the first boot drive 104a is configured in a redundant array of independent disks ("RAID") configuration even though it is currently the only boot drive installed in the storage system 102. In an embodiment, the first boot drive 104a is configured by the controller 108 in a RAID 0 configuration. In an embodiment, by configuring the first boot drive 104a in a RAID configuration, the first boot drive 104a comprises RAID metadata which may be helpful when an additional boot drive is added to the storage system 102.

Figure 4:
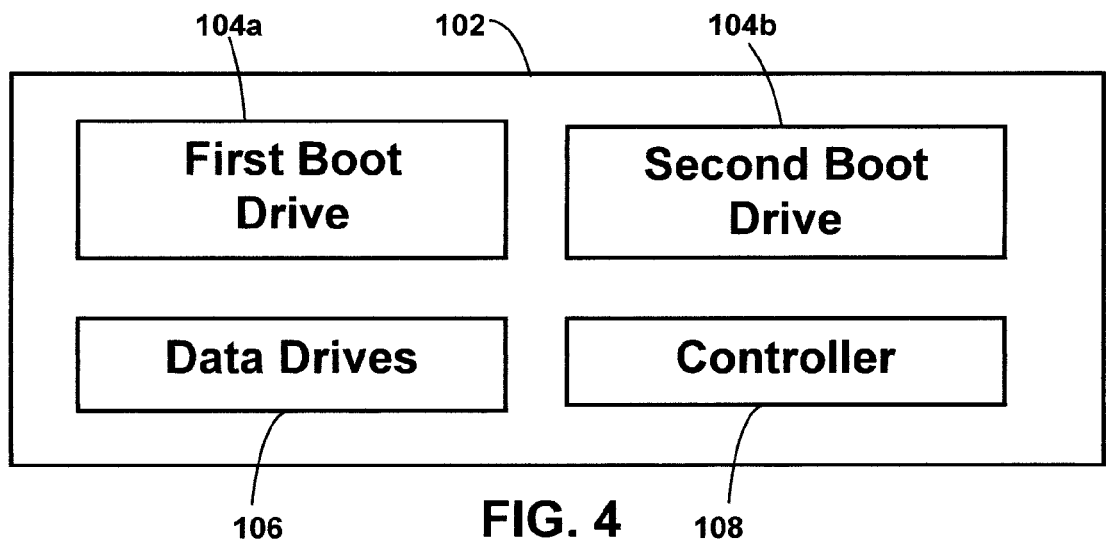
FIG. 4 depicts a storage system according to an embodiment.
Figure 5:
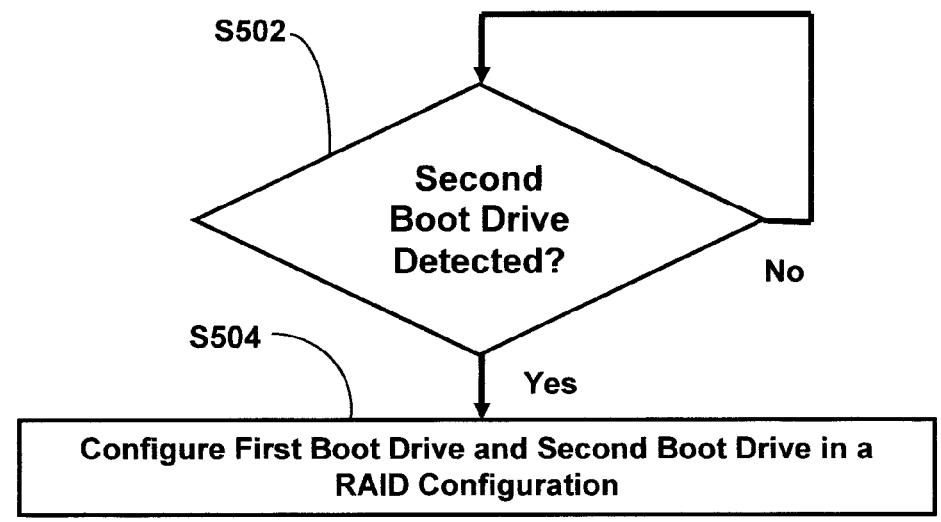
FIG. 5 depicts a process for configuring a first boot drive and a second boot drive according to an embodiment.

In an embodiment shown in FIG. 4, a second boot drive 104b can be added to the storage system 102. In an embodiment, as shown in FIG. 5, the controller 108 can determine when the second boot drive 104b has been added. For example, in an embodiment shown in FIG. 5, in block S502, the controller 108 can detect whether the second boot drive 104b is installed or not. If the second boot drive 104b is detected as being installed, in block S504, the controller 108 can configure the first boot drive 104a and the second boot drive 104b in a RAID configuration. For example, the first boot drive 104a and the second boot drive 104b can be configured in a RAID 1 configuration. In an embodiment, this can reduce an operational down time of the storage system 102 since a user does not have to manually configure boot drives 104a and 104b in a RAID configuration and the operating system can be mostly or fully functional during the RAID configuration of the boot drives 104a and 104b.

In an embodiment, the controller 108 automatically migrates data from the first boot drive 104a to the second boot drive 104b while allowing for an operating system to function. In an embodiment, this can reduce an operational down time of the storage system 102 since the storage system 102 will be mostly or fully functional during the migration of data. In an embodiment, the controller 108 automatically migrates data from the first boot drive 104a to the second boot drive 104b when the second boot drive 104b is detected.

Since the first boot drive 104a already contains RAID metadata, the RAID metadata in the first boot drive 104a can be adjusted to indicate that the first boot drive 104a is now paired with the second boot drive 104*b*. In an embodiment, this can reduce an operational down time of the storage system 102 since the data stored in the first boot drive 104*a* need not be reconfigured to introduce the RAID metadata. In an embodiment, the second boot drive 104*b* can be configured to also have RAID metadata indicating that the second boot drive 104*b* is paired with the first boot drive 104*a*. In an embodiment, data from the first boot drive 104*a* is preserved in the first boot drive 104*a* when the first boot drive 104*a* and the second boot drive 104*b* are configured to be in the RAID configuration.

In an embodiment, in block S502, if the controller 108 does not detect the second boot drive 104*b*, the controller can repeat block S502. However, in an embodiment, the controller 108 can instead proceed to perform other options. For example, if the process disclosed in FIG. 5 occurs during boot up, the controller 108 can instead initialize the first boot drive 104*a* and hand off to an operating system stored in the first boot drive 104*a*.

Figure 6:
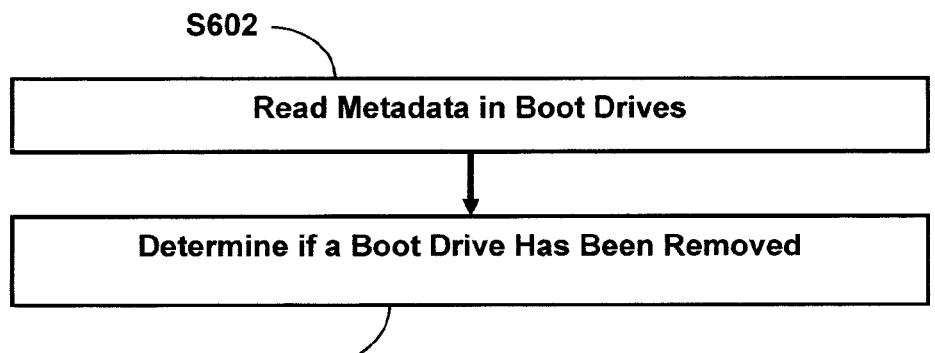
FIG. 6 depicts a process for determining if a boot drive has been removed according to an embodiment.

In an embodiment, the controller 108 detects when the first boot drive 104*a* or the second boot drive 104*b* has been removed from the storage system 102, as shown in an embodiment in FIG. 6. In block S602, the controller 108 reads the RAID metadata from the first boot drive 104*a*, which indicates that the second boot drive 104*b* should be installed on the storage system 102. In block S604, the controller 108 determines if the second boot drive 104*b* has been removed from the storage system 102. If the second boot drive 104*b* has been removed from the storage system 102, the controller 108 can detect that the second boot drive 104*b* is missing. Similarly, the controller 108 can read the RAID metadata from the second boot drive 104*b* which indicates that the first boot drive 104*a* should be installed on the storage system 102. If the first boot drive 104*a* has been removed from the storage system 102, the controller 108 can detect that the first boot drive 104*a* is missing.

Figure 7:
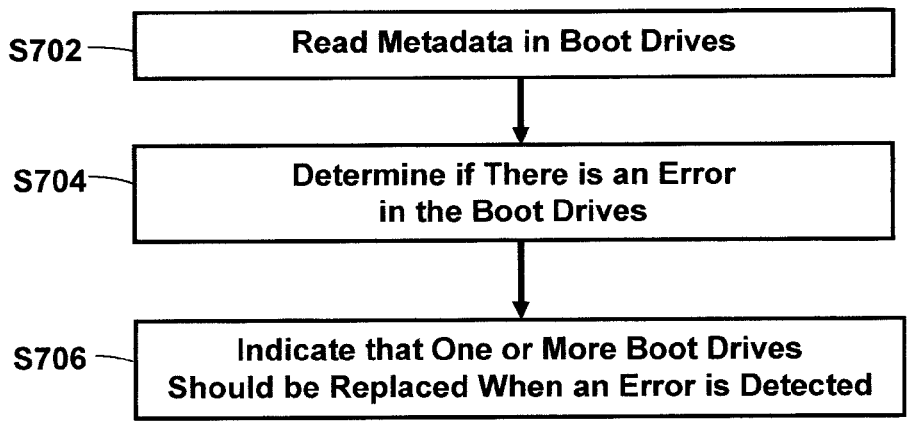
FIG. 7 depicts a process for determining if there is an error in a boot drive according to an embodiment.

In an embodiment shown in FIG. 7, the controller 108 can also detect when the first boot drive 104*a* or the second boot drive 104*b* has an error and should be replaced. In block S702, the controller 108 reads the RAID metadata of the first boot drive 104*a* and/or the second boot drive 104*b*. For example, an indication that the first boot drive 104*a* or the second boot drive 104*b* has an error can be written to the RAID metadata of the first boot drive 104*a*, the second boot drive 104*b*, or both the first boot drive 104*a* and the second boot drive 104*b*.

In block S704, the controller 108 determines if there is an error in the first boot drive 104*a*, or the second boot drive 104*b*. In block S706, when the controller 108 determine that the first boot drive 104*a*, or the second boot drive 104*b* has an error, the controller 108 can display a warning to a user to replace the boot drive with the error. Thus, if the first boot drive 104*a* has an error, the controller 108 can display a warning to the user to replace the first boot drive 104*a*.

Similarly, if the second boot drive 104*b* has an error, the controller 108 can display a warning to the user to replace the second boot drive 104*b*.

In an embodiment, the use of the RAID configuration for the first boot drive 104*a* and the second boot drive 104*b* reduces the failure rate of the storage system 102 based on failures of a boot drive.

Figure 8:
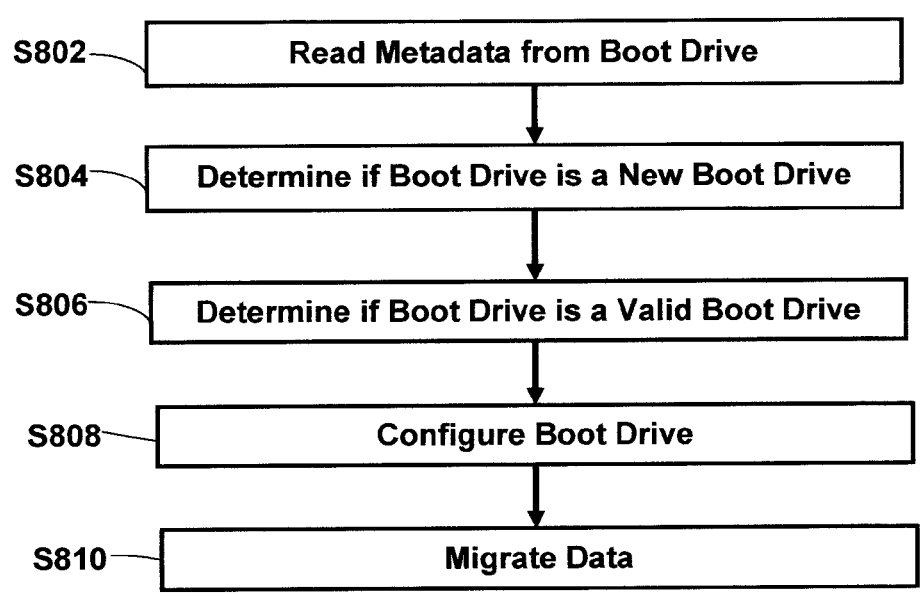
FIG. 8 depicts a process for configuring and migrating data to a boot drive according to an embodiment.

In an embodiment, the controller 108 can also determine whether a boot drive is a new and valid boot drive using the RAID metadata from the boot drive as shown in an embodiment in FIG. 8. For example, in block S802, the controller 108 can read RAID metadata from the second boot drive 104*b*. In block S804, the controller 108 can determine whether the second boot drive 104*b* is a new boot drive using the RAID metadata from the second boot drive 104*b*. For example, if the second boot drive 104*b* does not have RAID metadata or does not have RAID metadata which corresponds to the RAID metadata of the first boot drive 104*a*, then the controller 108 determines that the second boot drive 104*b* is a new boot drive. The controller 108 can then configure the second boot drive 104*b* in the RAID configuration, and migrate data from the first boot drive 104*a* to the second boot drive 104*b*.

In an embodiment, a new boot drive does not mean that the boot drive has to be unused (e.g. with no data on the boot drive). Instead, a new boot drive is one which does not have RAID metadata or does not have RAID metadata which corresponds to the first boot drive 104*a*. Thus, if the second boot drive 104*b* has been removed from the storage system 102 for a period of time, and then replaced in the storage system 102, the second boot drive 104*b* may be considered to be a new boot drive because the RAID metadata from the second boot drive 104*b* may not match the metadata from the first boot drive 104*a*.

In block S806, the controller 108 determines if a boot drive is a valid boot drive. For example, when the second boot drive 104*b* is detected as a new boot drive, the controller 108 can also determine whether the second boot drive 104*b* is a valid boot drive. In an embodiment, a valid boot drive is a boot drive which meets a predetermined specification such as a certain model of a boot drive, performance criteria, storage capacity, or any combination thereof. If the second boot drive 104*b* is not a valid boot drive, the controller 108 may prevent the configuration of the second boot drive 104*b* in a RAID configuration with the first boot drive 104*a*. The controller 108 may also display a warning to a user in such a case.

In block S808, the controller 108 can configure the second boot drive 104*b* when the second boot drive 104*b* is detected as a new boot drive and a valid boot drive. In block S810, the controller 108 automatically migrates data from the first boot drive 104*a* to the second boot drive 104*b* when the second boot drive 104*b* is detected as a new boot drive and a valid boot drive.

In an embodiment, the boot drives 104*a* and 104*b* can be backed up to the data drives 106. In an embodiment, this can further reduce the failure rate of the boot drives 104 because even if all of the boot drives 104 fail, the data from the boot drives 104 may still be able to be recovered in the data drives 106.

Although an installation of a second boot drive 104*b* is shown in the examples provided above, in an embodiment, additional boot drives may be utilized. For example, more than two boot drives 104 may be utilized in the storage system 102. Similarly, although data drives 106 are shown, in an embodiment, the storage system 102 can initially include no data drives 106. One or more of the data drives 106 can then be added at a later point in time.

Figure 9:
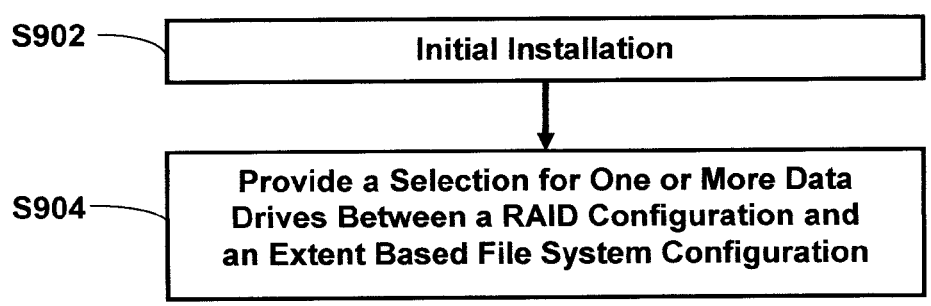
FIG. 9 depicts a process for configuring a data drive according to an embodiment.

In an embodiment, the controller 108 configures the data drives 106 in the RAID configuration or in an extent based file system configuration, as shown in an embodiment in FIG. 9. In block S902, an initial installation of the data drives 106 is performed by the controller 108. The initial installation can occur, for example, during the first use of the data drives 106. In an embodiment, the initial installation can also occur, for example, when the user wants to reformat or reinstall the data drives 106. In block S902, the controller 108 provides a selection for the data drives 106 between a RAID configuration and an extent based file system configuration. In an embodiment, the configuration of the data drives 106 in the RAID configuration or in the extent based file system configuration is based on a user input.

In an embodiment, the extent based file system is capable of providing fault tolerance. In an embodiment, the extent based file system configuration may also manage logical volumes on storage drives. In an embodiment, the extent based file system configuration utilizes a journal to keep track of the spaces available in the data drives 106. In an embodiment, the extent based file system configuration utilizes one or more of the data drives 106 to form storage pools.

From the storage pools, volumes may be created by the extent based file system configuration. In an embodiment, the volumes comprise virtual disks located on the storage pool which may then be partitioned, formatted, and assigned drive letters. In an embodiment, the extent based file system can maintain the health of the data drives 106 and any redundancy selected. In an embodiment, the extent based file system stores metadata on every volume within the storage pool that defines how data will be stored within the storage pool. In an embodiment, the metadata comprises extent based file system metadata.

In an embodiment, the extent based file system configuration also allows the use of thin provisioning, which allows allocation of virtual drives larger than available space. With thin provisioning, blocks are only used from the pool as used by virtual disks.

In an embodiment, when a process creates a file, the extent based file system configuration allocates a whole extent. When writing to the file again, such as after performing other write operations, the data continues where the previous write left off. In an embodiment, this can reduce file fragmentation and/or file scattering. In an embodiment, the extent comprises a contiguous area of storage in a computer file system reserved for a file. In an embodiment, the extent based file system configuration need not limit a file to a single extent.

In an embodiment, the extent based file system configuration allows for the data drives 106 to be of different types and have different storage capacities, without the storage capacity differential between different data drives 106 being wasted. In an embodiment, a first data drive can comprise a first type of data drive and a second data drive can comprise a second type of data drive. Furthermore, in an embodiment, the first data drive can comprise a first size and the second data drive can comprise a second size different than the first size.

Thus, the first data drive can comprise a 1 TB magnetic rotating disk, while the second data drive can comprise a 250 GB solid state memory. In such a case, the first data drive and the second data drive may have a total storage capacity of 1.25 TB, which can be divided by half or more if the first data drive and the second data drive were to be mirrored. Thus, the magnetic rotating disk may be utilized alongside the solid state memory.

Furthermore, the storage capacity differential of 750 GB in the magnetic rotating disk would not be wasted. Instead, the first data drive may configured to store a first amount of user data, and the second data drive may be configured to store a second amount of user data different than the first amount of user data.

In an embodiment, the controller 108 may also configure the boot drives 104 in an extent based file system configuration. In such a case, the BIOS stored in a flash memory may also be utilized to configure the boot drives 104 in the extent based file system configuration. In an embodiment, the controller 108 may provide for a selection for one or more boot drives 104 between a RAID configuration and an extent based file system configuration.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A storage system comprising:
   a first boot drive configured to store an operating system;
   one or more data drives configured to store user data, the one or more data drives being distinct from the first boot drive; and
   a controller configured to:
   detect when a second boot drive is added to the storage system;
   determine whether the second hoot drive is a valid hoot drive;
   automatically configure the first boot drive and the second boot drive in a redundant array of independent disks ("RAID") configuration when the controller detects that the second boot drive added to the storage system is a valid boot drive; and
   prevent configuration of the second hoot drive in the RAW configuration when the controller determines that the second boot drive added to the storage system is not a valid boot drive.

2. The storage system of claim 1 wherein the first boot drive comprises RAID configuration metadata and the second boot drive comprises RAID configuration metadata.

3. The storage system of claim 2 wherein the controller is configured to determine when the first boot drive or the second drive contains an error by analyzing the RAID configuration metadata of the first boot drive and the RAID configuration metadata of the second boot drive.

4. The storage system of claim 2 wherein the controller is configured to determine when the second boot drive is a new boot drive by analyzing the RAID configuration metadata of the second boot drive.

5. storage system of claim 4 wherein the controller is further configured to automatically configure the first boot drive and the second boot drive in the RAID configuration when the controller determines that the second boot drive is a new boot drive.

6. The storage system of claim 5 wherein the controller further determines that the second boot drive is a new boot drive by comparing the RAID configuration metadata of the second boot drive with the RAID configuration metadata of the first boot drive.

7. The storage system of claim 4 wherein the controller is further configured to automatically configure the first boot drive and the second boot drive in the RAID configuration when the second boot drive is determined to be new boot drive.

8. The storage system of claim 1 wherein the controller is further configured to configure the first boot drive and the second boot drive in a RAID 1 configuration.

9. The storage system of claim 1 wherein the controller is further configured to automatically migrate data from the first boot drive to the second boot drive when the controller detects that the second hoot drive is added to the storage system.

10. A method for configuring a first boot drive and a second boot drive in a storage system, the method comprising:
   detecting when the second boot drive is added to the storage system using a controller in the storage system, wherein the storage system further comprises one or more data drives distinct from the first boot drive;
   determining whether the second boot drive is a valid boot drive;
   automatically configuring the first boot drive and the second boot drive in a redundant array of independent disks ("RAID") configuration when the controller detects that the second boot drive added to the storage system as a valid boot drive; and
   preventing, configuration of the second boot drive in the RAID configuration when the second boot drive added to the storage system is determined not to be a valid boot drive,
   wherein the first boot drive is configured to store an operating system, and the one or more data drives are configured to store user data.

11. The method of claim 10 wherein the first boot drive comprises RAID configuration metadata and the second boot drive comprises RAID configuration metadata.

12. The method of claim 11 further comprising:
   determining when the first boot drive or the second drive contains an error by analyzing the RAID configuration metadata of the first boot drive and the RAID configuration metadata of the second boot drive.

13. The method of claim 11 further comprising:
   determining when the second boot drive is a new boot drive by analyzing the RAID configuration metadata of the second boot drive.

14. The method of claim 13 further comprising:
   automatically configuring the first boot drive and the second boot drive in the RAID configuration when the controller determines that the second boot drive is a new boot drive.

15. The method of claim 14 further comprising:
   determining that the second boot drive is a new boot drive by comparing the RAID configuration metadata of the second boot drive with the RAID configuration metadata of the first boot drive.

16. The method of claim 13
   wherein automatically configuring comprises automatically configuring the first boot drive and the second boot drive in the RAID configuration when the second boot drive is determined to be a new boot drive.

17. The method of claim 10 further comprising:
   configuring the first boot drive and the second boot drive in a RAID 1 configuration.

18. The method of claim 10 further comprising:
   automatically migrating data from the first boot drive to the second boot drive when the controller detects that the second boot drive is added to the storage system.

19. A server comprising:
   a boot drive configured to store an operating system;
   one or more data drives configured to store user data, the one or more data drives being distinct from the boot drive; and
   a controller configured to:
      provide a selection for the one or more data drives between a redundant array of independent disks ("RAID") configuration and an extent based file system configuration.

20. The server of claim 19 wherein the one or more data drives comprise a first data drive comprising a first size, and a second data drive comprising a second size different than the first size.

21. The server of claim 20 wherein the first data drive is configured to store a first amount of user data, and the second data drive is configured to store a second amount of user data different than the first amount of user data.

22. The server of claim 19 wherein the one or more data drives comprise a first data drive comprising a first type of data drive, and a second data drive comprising a second type of data drive different than the first type of data drive.

23. The server of claim 22 wherein the first type of data drive comprises a hard disk drive, and the second type of data drive comprises a solid state drive.

24. The server of claim 19 wherein the extent based file system configuration is configured to utilize a journal to keep track of space available in the one or more data drives, utilize the one or more data drives to form storage pools, and utilize the storage pools to create volumes.

* * * * *